United States Patent [19]
Masunaga

[11] Patent Number: 4,752,228
[45] Date of Patent: Jun. 21, 1988

[54] SPHERICAL DISPLAY DEVICE

[76] Inventor: Shuichi Masunaga, 11-18, Higashihagoromo 6-chome, Takaishi-shi, Osaka, Japan

[21] Appl. No.: 16,711

[22] Filed: Feb. 19, 1987

[30] Foreign Application Priority Data

Dec. 9, 1986 [JP] Japan .................. 61-293865

[51] Int. Cl.⁴ ............................................. G09B 27/08
[52] U.S. Cl. ...................... 434/131; 434/287
[58] Field of Search ................ 434/131–148, 434/287

[56] References Cited

U.S. PATENT DOCUMENTS

| | | | |
|---|---|---|---|
| 651,804 | 6/1900 | Houghton | 434/131 X |
| 2,483,932 | 10/1949 | Powell | 434/131 |
| 2,957,252 | 10/1960 | Pain | 434/136 |
| 2,958,959 | 11/1960 | Hubbard | 434/131 |
| 3,055,123 | 9/1962 | Wigal | 434/137 |

FOREIGN PATENT DOCUMENTS 55-20234  5/1980  Japan .

*Primary Examiner*—Richard J. Apley
*Assistant Examiner*—Robert W. Bahr
*Attorney, Agent, or Firm*—Wenderoth, Lind & Ponack

[57] ABSTRACT

A terrestrial globe for observing the polar areas. The globe is made from a pair of semi-spherical members put together along a vertical plane into a spherical body. The globe is supported on a pivotally supported semi-circular member which opens upwardly. The semi-spherical members are rotatable together with each other around a vertical polar shaft, and independently of each other around horizontal rotary shafts. The polar shaft is formed at both ends with eccentric shank portions so as to allow one of the semi-spherical members at one side to rotate freely around the rotary shaft while preventing the one at the other side from rotating around the rotary shaft. When it is desired to turn the spherical body upside down, that is, to reverse the positions of the South Pole and the North Pole, the semi-spherical member at the shank-free side is rotated by 180° around the rotary shaft. Then the spherical body is turned by 180° around the polar shaft to bring the other semi-spherical member to the shank-free side, which is then turned by 180° around the rotary shaft.

2 Claims, 3 Drawing Sheets

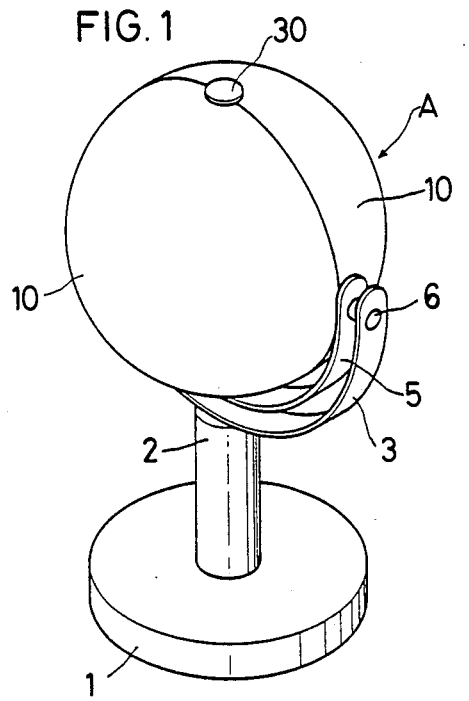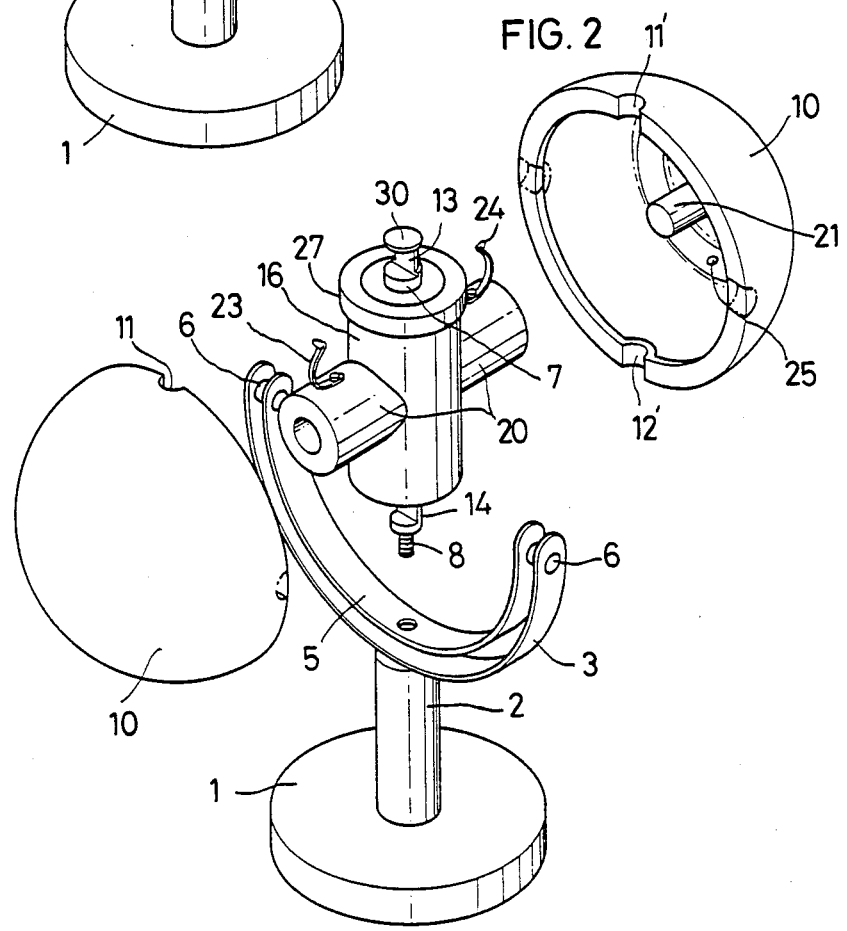

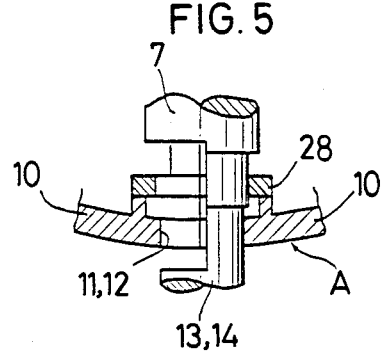
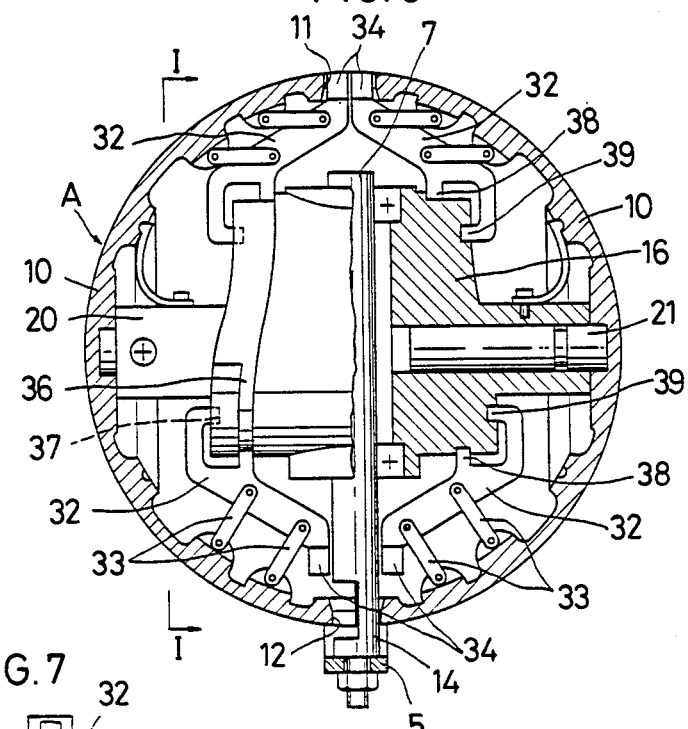
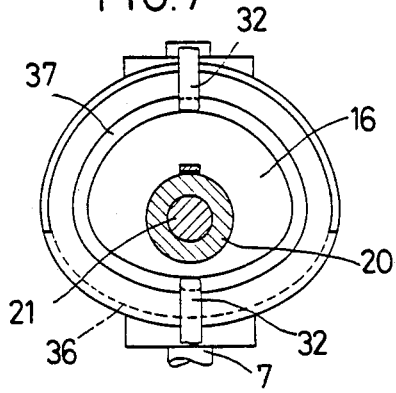

SPHERICAL DISPLAY DEVICE

BACKGROUND OF THE INVENTION

The present invention relates to a spherical display device such as a terrestrial, lunar or celestial globe used for teaching.

Most of the conventional terrestrial globes have a spherical body supported by a semi-circular or circular supporting frame so as to be rotatable around its vertical axis.

Another conventional terrestrial globe is disclosed in Japanese Patent Publication No. 55-20234 which has a spherical body housed in a transparent semi-spherical capsule held in a frame on a pedestal.

With the conventional terrestrial globe of the former type, the supporting frame obstructs observations, particularly of the portion around the South Pole.

The terrestrial globe disclosed in Japanese Patent Publication No. 55-20234 has an advantage that the spherical body can be turned in any direction. But, when it comes to explaining the rotation of the earth, it is very inconvenient, and also because the surface of the spherical body touches projections on the inner surface of the capsule, it is easily damaged.

SUMMARY OF THE INVENTION

An object of the present invention is to provide a spherical display device which obviates the abovesaid shortcomings.

In accordance with the present invention, there is provided a spherical display device for displaying a map or the like thereon comprising a spherical body formed by a pair of semi-spherical members, a polar shaft extending vertically through said spherical body, support means for supporting said polar shaft, a rotation support means mounted on said polar shaft for supporting said semi-spherical members so as to be rotatable around an axis perpendicular to said polar shaft, said polar shaft having at each end thereof an eccentric shaft which is adapted to be received in each of two holes formed in said spherical body, and allows only one of said semi-spherical members to be turned around an axis perpendicular to said polar shaft.

With the device according to the present invention, the area near the South Pole can be easily observed by bringing it up by turning by 180 degrees the semi-spherical member at that side where the eccentric shaft does not obstruct, around an axis perpendicular to the polar shaft, turning the spherical body by 180 degrees around the polar shaft, and turning by 180 degrees the semi-spherical member at said side around said axis. Also, as with conventional terrestrial globes, the device according to the present invention is convenient for explaining the rotation of the earth with its axis inclined by inclining the polar shaft together with the meridian frame and turning the spherical body around the polar shaft.

Other objects and features of the present invention will become apparent from the following description taken with reference to the accompanying drawings, in which:

BRIEF DESCRIPTION OF THE DRAWINGS

FIG. 1 is a perspective view of an embodiment of the present invention;

FIG. 2 is an exploded perspective view of the same;

FIG. 5 is an enlarged vertical cross sectional view showing another example of a portion adjacent the round hole through which the eccentric shank passes;

FIG. 6 is an enlarged front view in vertical section of another embodiment; and

FIG. 7 is a sectional view taken along line I—I of FIG. 6 with the spherical body not shown.

DETAILED DESCRIPTION OF THE PREFERRED EMBODIMENT

Figure 3:
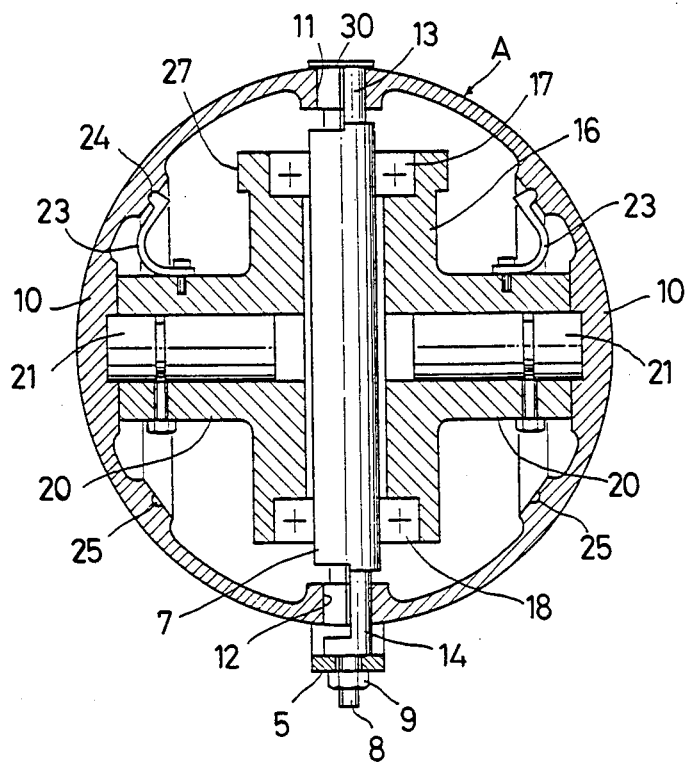
FIG. 3 is an enlarged front view in vertical section of the spherical body of the same.

Referring now to FIGS. 1 to 4 showing an embodiment of the present invention, numeral 1 designates a pedestal. A vertical pillar 2 is mounted on the pedestal 1, and a semi-circular supporting frame 3 has its center fixed to the top of the pillar 2 with its opening facing up.

A semi-circular meridian frame 5 is arranged just inside the supporting frame 3 with a slight gap therebetween. Both ends of the meridian frame 5 are coupled to the respective ends of the supporting frame 3 by horizontal pins 6 so that the meridian frame 5 will be pivotable around the pins 6.

A polar shaft 7 is mounted in the center of the meridian frame 5. A male screw 8 formed at the lower end of the polar shaft 7 is screwed into an opening in the center of the meridian frame 5 and fastened by a nut 9 as shown in FIG. 3.

Although the polar shaft 7 is rotatable around the pins 6 by 360 degrees together with the meridian frame 5, let us suppose in the following description that the polar shaft 7 stands vertically on the meridian frame 5 as shown in FIGS. 1 to 3.

Figure 4:
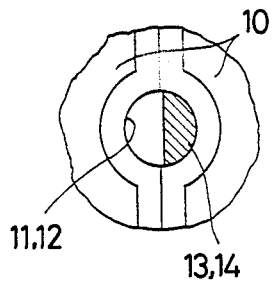
FIGS. 4 (a), (b) and (c) are enlarged transverse cross sectional views showing examples of the eccentric shanks of the polar shaft of the same.
Figure 4:
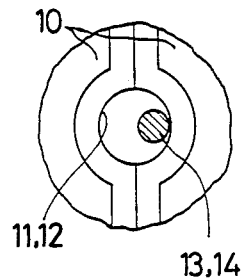
Figure 4:
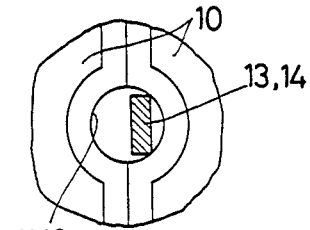

A represents a hollow spherical body comprising a pair of semi-spherical members 10. At the upper and lower ends of the polar shaft 7 there are eccentric shanks 13 and 14, which are inserted into round holes 11 and 12 formed in the spherical body A. These shanks 13 and 14 may be of a semi-circular, round or rectangular section and, as shown in FIG. 4, are eccentric in the round holes 11 and 12 which consist of half-round portions 11' and 12' of the members 10 (FIG. 2).

A rotation support 16 is mounted on the intermediate portion of the polar shaft 7 by means of upper and lower bearings 17 and 18. At both sides of of the rotation support 16 are provided support tubes 20 extending at a right angle to the polar shaft 7. The support tubes 20 are integral with the rotation support 16. Rotary shafts 21 secured to the center of the inside of both semi-spherical, which are members 10, are rotatably received in the support tubes 20, and suitable means for preventing the rotary shaft from coming off is provided.

On each of the support tubes 20, a click stop 23 of spring material is provided. Engaging portions 24 at their tip are adapted to be releasably engaged in a plurality of recesses 25 formed in the inner surface of the semi-spherical members 10, so that the members 10 will be temporarily locked in position at angular intervals.

The polar shaft 7 is rotatable around the horizontal pins 6 by 360 degrees together with the spherical body A. Given that the meridian frame 5 also rotates with the polar shaft 7, at its end opposite to the meridian frame 5, the support 16 has an enlarged portion 27 so as to serve as a balancer, so that the center of gravity will be in the center of the spherical body A.

With the structure as shown in FIG. 3 in which the eccentric shanks 13 and 14 are in a direct contact with the inner wall of the round holes 11 and 12, respectively, there is a fear that wear might progress rapidly particularly if the shanks are made of a metal and the spherical body A is made of plastic. To avoid this, it is advisable to provide metallic reinforcing rings 28 inside of the round holes 11 and 12, as shown in FIG. 5.

Supposing the spherical body A in the above embodiment is a terrestrial globe, the center of the round hole 11 at the top of the body A corresponds to the North Pole, the center of the round hole 12 at its bottom to the South Pole, and the crack in the body A; that is, the parting line between two semi-spherical members 10, corresponds to one meridian extending from the South Pole to the North Pole. Accordingly, when sticking a map on the terrestrial globe, the parting line between the semi-spherical members 10 corresponds to the line at which the longitude is 0 degree and 180 degrees.

In FIG. 3, no eccentric shanks 13 and 14 exist in the lefthand half of the round holes 11 and 12. This allows the lefthand member 10 to rotate freely around the rotary shaft 21 and thereby to reverse the positions of the South Pole and the North Pole. But, the righthand member 10 is hindered from rotating around the rotary shaft 21 by the eccentric shanks 13 and 14 of the polar shaft 7 engaging in the right sides of the round holes 11 and 12. Therefore, after turning the lefthand member 10 upside down as described above, the body A has to be turned around the polar shaft 7 by 180 degrees and the lefthand member 10 is then turned around the rotary shaft 21 by 180 degrees. Now, the entire spherical body A has been turned to bring the South Pole upside, thus facilitating the observation of the part near the South Pole.

In the above embodiment, the map of the polar area is displayed on a pole plate 30 stuck on the upper end of the polar shaft 7. The pole plate 30 for the North Pole remains there even when the body A is turned over to bring the South Pole to the top.

This problem can be solved by providing two plates, one for the North Pole and the other for the South Pole, and replacing with each other every time the body A is reversed. But, in the second embodiment shown in FIGS. 6 and 7, the maps of the polar areas are adapted to be automatically replaced when the body A is reversed. The external structure of this embodiment is identical to the first embodiment. What is different is its inside mechanism of the body A.

With this embodiment, the upper end of the polar shaft 7 terminates inside the body A. Movable members 32 are arranged inside the polar areas of the semi-spherical members 10. Each of them is coupled to the inner surface of the respective semi-spherical member 10 by means of a pair of links 33 so as to be movable in a parallel manner with one another. Each movable member 32 is provided at its outer end with a semi-circular pole-forming portion 34 adapted to get in and out of the round holes 11 and 12. When the pole-forming portions 34 are inserted into the round holes 11 and 12, their outer end surface forms a part of the outer spherical surface of the body A, and displays the map of either the North Pole or the South Pole.

The rotation support 16 in the body A has its outer periphery and the end faces serving as guide faces. Its outer periphery is formed with a guide groove 36 extending in the circumferential direction, and its end faces are formed with guide grooves 37. A pair of sliding portions provided at the inner end of each movable member 32 are slidably engaged in the guide grooves 36 and 37, respectively.

In FIG. 6, the pole-forming portions 34 of a pair of movable members 32 are in the round hole 11, and their upper end faces are flush with the outer surface of the body A. A map of the North Pole is displayed there if the upper part of the globe corresponds to the North Pole. In FIG. 6, the pole-forming portions 34 at the tips of the lower movable members 32 are retracted inside the body A.

From this state, rotating the lefthand semi-spherical member 10 around the rotary shaft 21 by 180 degrees will cause the sliding portions 38 and 39 of the lower movable member 32 to move upwardly and outwardly guided by the guide grooves 36, 37, so that the pole-forming portions 34 on the movable members 32 for the South Pole will get into one half of the round hole 12 at the top of the globe.

Next, the body A is turned around the polar shaft 7 by 180 degrees, and then the lefthand member 10 is again turned around the rotary shaft 21 by 180 degrees. Now, both of the pole-forming portions 34 are successfully inserted into the top round hole 12 to complete the South Pole.

Although with the above embodiments, the semi-spherical members 10 are turned around the rotary shafts 21 perpendicular to the polar shaft 7, the rotary shafts 21 may be replaced with fixed shafts around which the members are to be rotated. The members 10 may be also adapted to be rotated along a plurality of guide rollers provided on the support tubes 20, so long as the semi-spherical members 10 at both sides of the polar shaft 7 are rotatable around an axis perpendicular to the polar shaft 7 by 360 degrees.

Although in the above embodiments the polar shaft 7 is fixed to the meridian frame 5 and can be pivoted around the pins 6 together with the meridian frame, the meridian frame 5 and the supporting frame 3 may be omitted and the polar shaft 7 may be secured directly on the pillar 2, or on a proper pedestal. Also, holes (shown by chain lines in FIG. 2) may be provided at the middle between the round holes 11 and 12, that is, at the position shown in FIG. 2, so that the spherical body A can be rotated at angular intervals of 90 degrees.

What I claim:

1. A spherical display device for displaying a map or the like thereon comprising:
    a spherical body formed by a pair of semi-spherical members, each of said semi-spherical members having a pair of alignable holes formed therein;
    a polar shaft extending vertically through said spherical body;
    support means for supporting said polar shaft;
    a rotation support means mounted on said polar shaft for supporting said semi-spherical members for rotation about an axis perpendicular to said polar shaft; and,
    said polar shaft having on at least one end thereof an eccentric shaft which is received in at least one of the two holes formed in one of the semi-spherical members for allowing the other of said semi-spherical members to be turned about an axis perpendicular to said polar axis.

2. A spherical display device as claimed in claim 1 further comprising
    a pair of movable members coupled to the inner surface of each of said semi-spherical members, said movable members being provided at one end thereof with a pole-forming portion and at the other end thereof with a pair of sliding portions, said pole-forming portion being movable into and out of one of said holes in said spherical body, and said sliding portions being slidably mounted in guide grooves formed in the outer periphery of said rotation support.

* * * * *

UNITED STATES PATENT AND TRADEMARK OFFICE
CERTIFICATE OF CORRECTION

PATENT NO. : 4,752,228

DATED : June 21, 1988

INVENTOR(S) : Shuichi Masunaga

It is certified that error appears in the above-identified patent and that said Letters Patent is hereby corrected as shown below:

On the title page, after item [76] insert:

-- [73] Assignees: Shuichi Masunaga, Sumie Masunaga, Ryoji Masunaga, Katsuko Mizoguchi and Kazutaka Mizoguchi, Osaka, Japan --.

Signed and Sealed this

Third Day of January, 1989

*Attest:*

DONALD J. QUIGG

*Attesting Officer*  *Commissioner of Patents and Trademarks*